United States Patent
Baba et al.

(10) Patent No.: US 8,326,114 B2
(45) Date of Patent: Dec. 4, 2012

(54) DATA PLAYBACK APPARATUS AND DATA PLAYBACK METHOD

(75) Inventors: Masayuki Baba, Tokyo (JP); Hiroyuki Kurokawa, Tokyo (JP); Mitsuyoshi Suzuki, Tokyo (JP); Takehiko Hanada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1374 days.

(21) Appl. No.: 11/947,022

(22) Filed: Nov. 29, 2007

(65) Prior Publication Data

US 2008/0131074 A1 Jun. 5, 2008

(30) Foreign Application Priority Data

Dec. 1, 2006 (JP) ................ 2006-325892

(51) Int. Cl.
*H04N 5/76* (2006.01)
(52) U.S. Cl. ........................................ 386/235
(58) Field of Classification Search .............. 386/65
See application file for complete search history.

(56) References Cited

U.S. PATENT DOCUMENTS

2002/0013949 A1* 1/2002 Hejna, Jr. ............... 725/100
2004/0141731 A1 7/2004 Ishioka et al.

FOREIGN PATENT DOCUMENTS

| JP | 2001-45065 | 2/2001 |
| JP | 2004-274572 | 9/2004 |
| JP | 2006-49941 | 2/2006 |

OTHER PUBLICATIONS

Office Action issued Apr. 5, 2011, in Japan patent Application No. 2006-325892 (with English translation).

* cited by examiner

*Primary Examiner* — Kambiz Zand
*Assistant Examiner* — Stephen Sanders
(74) *Attorney, Agent, or Firm* — Oblon, Spivak, McClelland, Maier & Neustadt, L.L.P.

(57) ABSTRACT

A control unit (3) is provided for storing time information of data which are received for the first time by a receiving unit (1) in a memory (3a), and for, every time when the receiving unit (1) detects time information, acquiring the time information from the receiving unit (1), calculating the difference between the acquired time information and the time information of the first received data stored in the memory (3a), and, when the difference reaches a predetermined amount, outputting a command for starting a playback of data to a playback unit (4). The playback unit (4) starts a playback of the data stored in the storage unit (2) when the command for starting a playback of data is outputted from the control unit (3).

20 Claims, 6 Drawing Sheets

DATA PLAYBACK APPARATUS AND DATA PLAYBACK METHOD

BACKGROUND OF THE INVENTION

1. Field of the Invention

The present invention relates to a data playback apparatus for and a data playback method of receiving data from, for example, a network and playing back the data.

2. Description of Related Art

When a conventional data playback apparatus receives packet data from, for example, a network, the data playback apparatus stores the packet data in a receive buffer, and, when the number of packet data stored in the receive buffer exceeds a reference value, the data playback apparatus starts a playback of the packet data stored in the receive buffer. After that, because a substantially constant amount of packet data is stored in the receive buffer, even if the number of packet data received temporarily decreases because of occurrence of a network fluctuation, the conventional data playback apparatus can perform a playback of packet data with stability while receiving packet data from the network because an extra amount of packet data is stored in the receive buffer.

Therefore, even if a transmission fluctuation occurs, the conventional data playback apparatus can continue to carry out a playback of packet data only during a time period during which a number of packets corresponding to the reference value are stored. Furthermore, when the conventional data playback apparatus detects decrease or increase in the number of packets stored in the receive buffer while playing back packet data for a long time, the conventional data playback apparatus can adjust the number of packets stored in the receive buffer by adjusting the playback speed of packet data (see patent reference 1).

However, the adjustment of the playback speed of the packet data on the basis of the number of packets stored in the receive buffer causes the time required for a predetermined number of packet data to be stored in the receive buffer to be not constant when packet data whose number per unit time is not constant are received, and therefore causes the degree of resistance to network fluctuations (the time period during which the data playback apparatus can withstand network fluctuations) to become unstable. In addition, in order to strengthen the resistance to network fluctuations, if the reference number of packets is increased too much, a time delay which occurs before the data playback apparatus starts a playback of packet data increases. For example, in a case in which the number of packets per unit time becomes unconstant if the reference number of packets is set to 100 packets, it takes 1 second to store packet data with 100 packets in the receive buffer at a time, or it takes 3 seconds to store packet data with 100 packets in the receive buffer at another time. Actually, this time period of 1 or 3 seconds is the degree of resistance to network fluctuations, and, when the fluctuation resistance of 1 second is sufficient, 3 seconds of delay can provide the user with displeasure at the time of real time communication.

[Patent reference 1] JP, 2001-45065,A (see paragraph numbers [0038] to [0042] and FIG. 1)

Because the conventional data playback apparatus is constructed as mentioned above, there is a problem that when packet data whose number per unit time is not constant are received, the time required for a predetermined number of packet data to be stored in the receive buffer becomes inconstant and therefore the degree of resistance to network fluctuations becomes unstable. Another problem is that when the reference number of packets is increased too much in order to strengthen the resistance to network fluctuations, a time delay which occurs before the data playback apparatus starts a playback of packet data increases.

SUMMARY OF THE INVENTION

The present invention is made in order to solve the above-mentioned problems, and it is therefore an object of the present invention to provide a data playback apparatus and a data playback method which can provide a desired degree of resistance to network fluctuations without causing any increase in a time delay that occurs before a playback of data is started.

In accordance with the present invention, there is provided a data playback apparatus including: a playback control means for storing time information of first received data which is detected by a time information detecting means, and for outputting a command for starting a playback of data when a difference between the time information of the first received data and time information detected by the time information detecting means reaches a predetermined amount; and a data playback means for starting a playback of data stored in a data storage means when the command for starting a playback of data is outputted from the playback control means.

According to the present invention, the playback control means stores time information of first received data which is detected by the time information detecting means, and outputs a command for starting a playback of data when the difference between the time information of the first received data and time information detected by the time information detecting means reaches a predetermined amount, and the data playback means starts a playback of data stored in the data storage means when the command for starting a playback of data is outputted from the playback control means. Therefore, the present invention provides an advantage of being able to provide a desired degree of resistance to transmission fluctuations without causing any increase in a time delay which occurs before the playback unit starts the playback of the data.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1.

Figure 1:
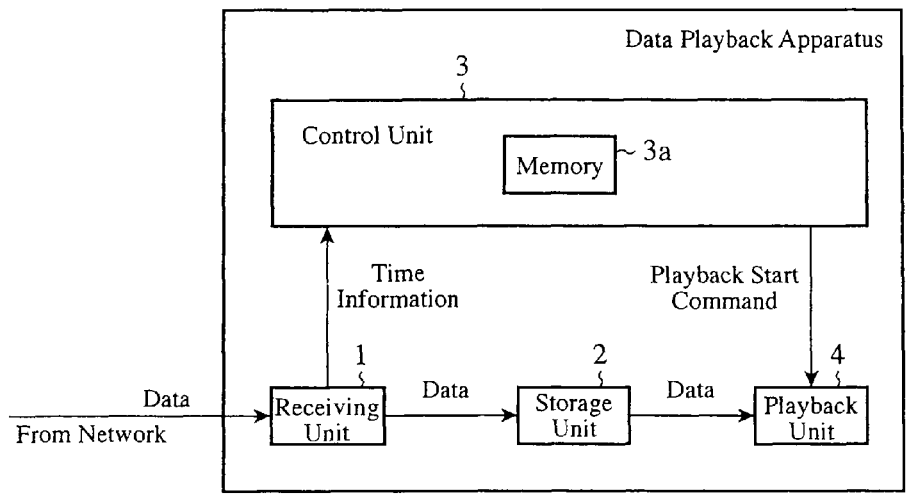
FIG. 1 is a block diagram showing data a playback apparatus in accordance with Embodiment 1 of the present invention.

FIG. 1 is a block diagram showing a data playback apparatus in accordance with Embodiment 1 of the present invention. In the figure, a receiving unit 1 carries out a process of receiving data, to which time information is added, from a transmission line, such as a network, and detecting the time information added to the data. The receiving unit 1 constructs a data receiving means and a time information detecting means. A storage unit 2 is a buffer for temporarily storing the data received by the receiving unit 1. The storage unit 2 constructs a data storage means.

A control unit 3 carries out a process of storing the time information of first received data which is detected by the receiving unit 1 in a memory 3a thereof, and acquiring time information from the receiving unit 1 every time when the receiving unit 1 detects the time information, acquiring the difference between the acquired time information and the time information of the first received data which is stored in the memory 3a, and, when the difference reaches a predetermined amount, outputting a command for starting a playback of the data to a playback unit 4. The control unit 3 constructs a playback control means. When the command for starting a playback of the data is outputted from the control unit 3, the playback unit 4 carries out a process of starting a playback of the data stored in the storage unit 2. The playback unit 4 constructs a data playback means.

Next, the operation of the data playback apparatus will be explained. When a data transmitting apparatus not shown in the figure transmits data to the network, the data are transmitted via the network and reaches the data playback apparatus with a transmission delay. As a result, the receiving unit 1 of the data playback apparatus receives the data from the network. At this time, for example, time information indicating the playback timing of the data is added to the data transmitted from the data transmitting apparatus. When receiving the data from the network, the receiving unit 1 stores the data in the storage unit 2, and also detects the time information added to the data and outputs the time information to the control unit 3.

When acquiring the time information of the data which are received for the first time by the receiving unit 1, the control unit 3 stores the time information in the memory 3a. After that, every time when the receiving unit 1 detects time information, the control unit 3 acquires the time information from the receiving unit 1 and then calculates the difference between the acquired time information and the time information of the first received data which is stored in the memory 3a. When the difference between the acquired time information and the time information of the first received data reaches a predetermined amount (e.g., 1 second), the control unit 3 outputs a command for starting a playback of data to the playback unit 4. When the command for starting a playback of data is outputted from the control unit 3, the playback unit 4 extracts the data stored in the storage unit 2 and then starts a playback of the data. After that, the data playback apparatus plays back the data while receiving data.

For example, when the data stored in the storage unit 2 correspond to 1 second in terms of time information, the time required for the playback unit 4 to play back the data is 1 second. After the first data were received by the receiving unit 1, when time information after a lapse of 1 second in terms of time information after the reception of the time information of the first received data is detected, data whose time length required for the playback unit 4 to play back is 1 second are stored in the storage unit 2. After that, when the playback unit 4 starts a playback of the data, the data playback apparatus can withstand a transmission fluctuation having a maximum of 1 second with the data of 1 second stored in the storage unit 2. Therefore, a desired degree of resistance to transmission fluctuations can be provided by determining the amount of data stored in the storage unit on the basis of the time information.

As can be seen from the above description, according to this Embodiment 1, the control unit 3 stores time information of data which are received for the first time by the receiving unit 1 in the memory 3a, and, every time when the receiving unit 1 detects time information, acquires the time information from the receiving unit 1, calculates the difference between the acquired time information and the time information of the first received data which is stored in the memory 3a, and, when the difference reaches a predetermined amount, outputs a command for starting a playback of data to the playback unit 4, and the playback unit 4 starts a playback of the data stored in the storage unit 2 when the command for starting a playback of data is outputted from the control unit 3. Therefore, the present invention provides an advantage of being able to provide a desired degree of resistance to transmission fluctuations without causing any increase in the time delay which occurs before the playback unit starts a playback of data. In other words, the time delay which occurs before the playback unit starts a playback of data becomes a predetermined amount, and a degree of fluctuation resistance corresponding to the predetermined amount can be provided.

Embodiment 2.

Figure 2:
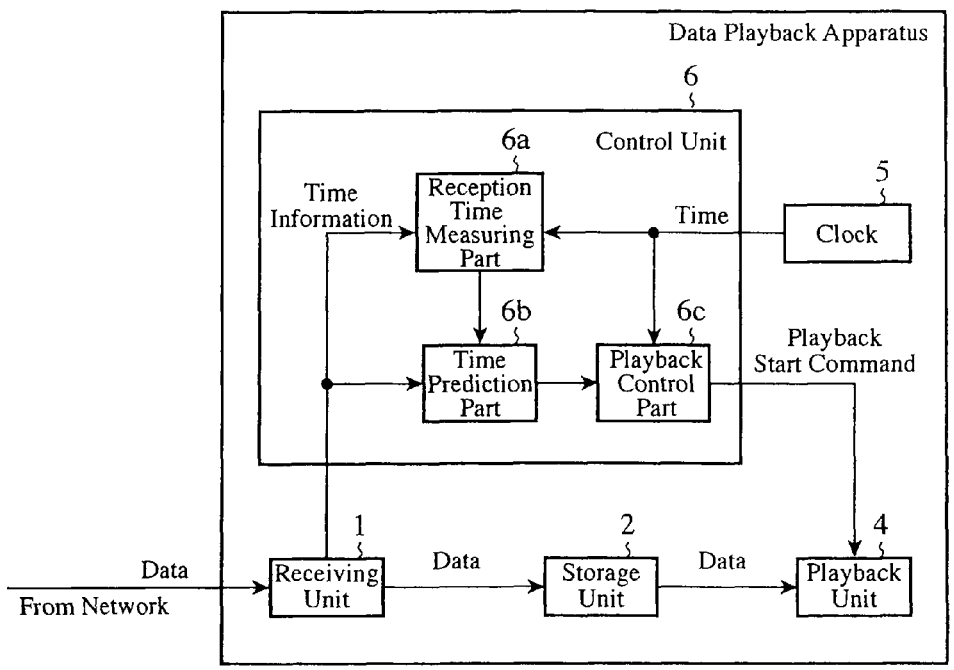
FIG. 2 is a block diagram showing a data playback apparatus in accordance with Embodiment 2 of the present invention.

FIG. 2 is a block diagram showing a data playback apparatus in accordance with Embodiment 2 of the present invention. In the figure, because the same reference numerals as those shown in FIG. 1 denote the same components or like components, the explanation of the components will be omitted hereafter. A clock 5 carries out a process of notifying a time to a control unit 6. The control unit 6 is comprised of a reception time measuring part 6a, a time prediction part 6b, and a playback control part 6c.

The reception time measuring part 6a of the control unit 6 carries out a process of measuring the time when data are received by the receiving unit 1 by acquiring the time from the clock 5. A reception time measuring means is constructed by the clock 5 and the reception time measuring part 6a. The time prediction part 6b of the control unit 6 carries out a process of detecting a minimum of the difference between the time measured by the reception time measuring part 6a and the time indicated by the time information detected by the receiving unit 1, and predicting the shortest time at which the storage amount of data in the storage unit 2 reaches a predetermined amount using the minimum of the difference. The time prediction part 6b constructs a time prediction means. The playback control part 6c of the control unit 6 carries out a process of outputting a command for starting a playback of data to the playback unit 4 when the shortest time predicted by the time prediction part 6b comes. The playback control part 6c constructs a playback control means.

Figure 3:
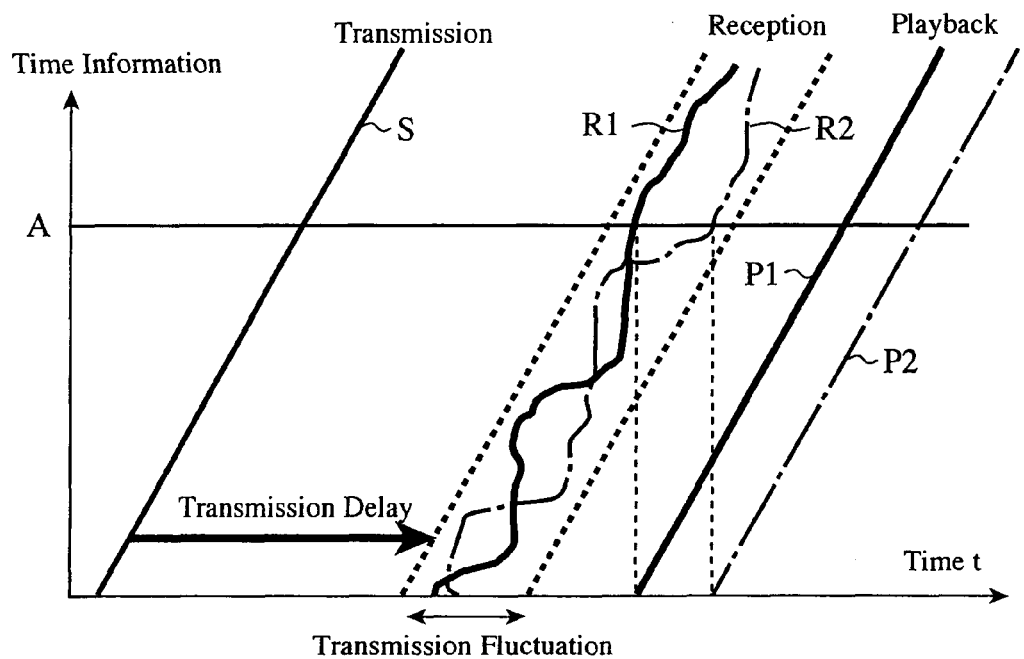
FIG. 3 is an explanatory drawing showing a relation between the reception time of data and time information added to the data.

FIG. 3 is an explanatory drawing showing a relation between the reception time of data and the time information added to the data. The figure shows a state in which a transmitting side transmits data to which time information is added with progress of time (see a straight line S). The figure also shows a state in which the data transmitted from the transmitting side has arrived at the receiving side with a transmission delay. FIG. 3 shows, as examples of reception of the data, two examples: a curve R1 and a curve R2. In each of the both examples, under the influence of a transmission fluctuation, the relation between the reception time of the data and the time information is not expressed by a straight line, but is expressed by the curve R1 or R2.

Assuming that the data playback apparatus starts a playback of data at a timing at which the data playback apparatus receives data to which time information A is added (i.e., a timing at which A seconds of data are stored in the storage unit 2), the playback timing differs according to the delay which occurs in the data at that time. When the relation between the reception time of data and the time information added to the data is expressed by the curve R1, the data playback apparatus plays back data with progress of time shown by a straight line P1, whereas when the relation between the reception time of data and the time information added to the data is expressed by the curve R2, the data playback apparatus plays back data with progress of time shown by a straight line P2.

The data playback apparatus has only to store a certain storage amount of data in the storage unit 2 to such an extent that the data playback apparatus can deal with the magnitude of the transmission fluctuation, and, when the transmission delay is the smallest, has only to store a certain amount of data which corresponds to a maximum transmission fluctuation. In other words, at the moment when the transmission delay is large, the storage unit 2a has only to store a small storage amount of data. Because a more than necessary amount of data are stored in the storage unit 2 in a case in which, for example, reception of data is carried out with progress of time shown by the curve R2 and a playback of data is started when A seconds of data are then stored in the storage unit 2, the delay which occurs at the time of playback of data increases.

Figure 4:
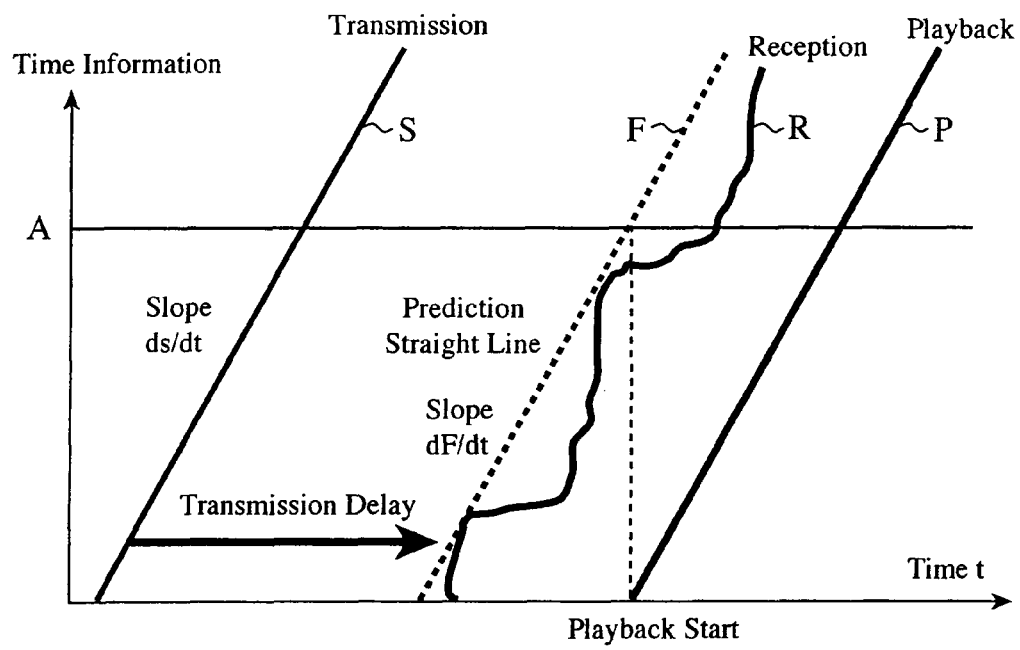
FIG. 4 is an explanatory drawing showing a prediction process carried out by a time prediction part 6b.
Figure 5:
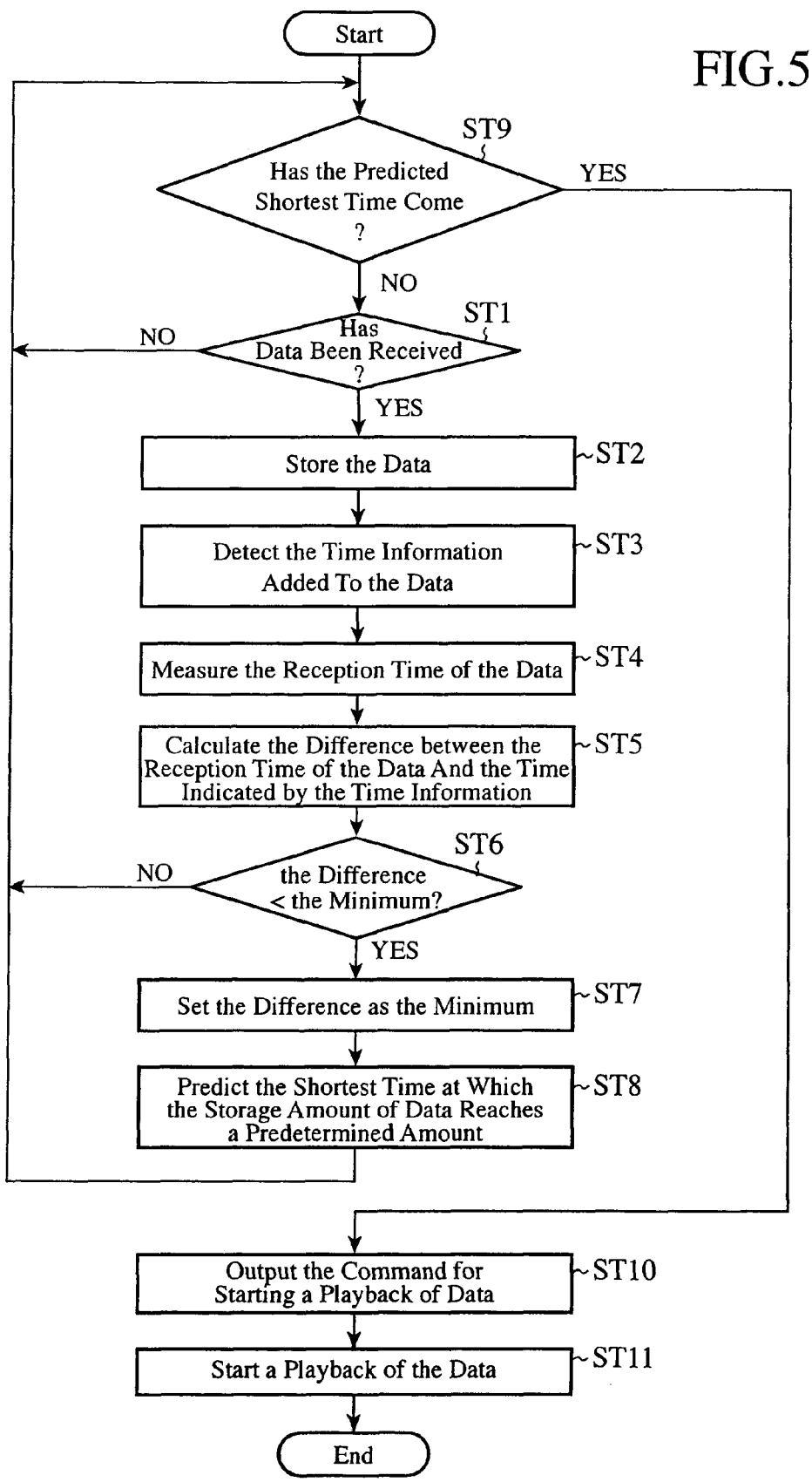
FIG. 5 is a flow chart showing a data playback method in accordance with Embodiment 2 of the present invention.

Also in a case in which reception of data is carried out with progress of time shown by the curve R2, no problem arises at all even if the data playback apparatus starts a playback of data at the same timing as that in the case in which the reception of the data is carried out with progress of time shown by the curve R1. In an ideal case, when the transmission delay is the smallest and A seconds of data are stored in the storage unit 2, the data playback apparatus can start a playback of the data. However, because the timings at which the two conditions are satisfied do not match each other, the data playback apparatus in accordance with this Embodiment 2 calculates a timing at which they match each other virtually. FIG. 4 is an explanatory drawing showing a prediction process carried out by the time prediction part 6b, and FIG. 5 is a flow chart showing a data playback method in accordance with Embodiment 2 of the present invention.

Next, the operation of the data playback apparatus will be explained. When a data transmitting apparatus not shown transmits data to which time information is added to a network (see a straight line S of FIG. 3), the data are transmitted via the network and reach the data playback apparatus with a transmission delay. When the data with the transmission delay reach the data playback apparatus, the receiving unit 1 of the data playback apparatus receives the data (step ST1) and stores the data in the storage unit 2 (step ST2). The receiving unit 1 detects the time information added to the data and outputs the time information to the control unit 6 (step ST3). Before the receiving unit 1 of the data playback apparatus receives the data, the playback control part 6c of the control unit 6 judges whether the time of the clock 5 indicates the shortest time at which A seconds of data are stored in the storage unit 2 (step ST9). In this example, assume that the time of the clock 5 does not indicate the shortest time at which A seconds of data are stored in the storage unit 2 and the control unit then shifts to step ST1.

When receiving the time information from the receiving unit 1, the reception time measuring part 6a of the control unit 6 acquires the time from the clock 5 so as to measure the time when the data are received by the receiving unit 1 (step ST4). When the reception time measuring part 6a measures the reception time of the data, the time prediction part 6b of the control unit 6 corrects either the reception time of the data or the time information so as to make both of them have the same unit in order to make it possible for a comparison between the reception time of the data and the time information detected by the receiving unit 1 to be performed even when, for example, the frequency of the clock 5 differs from that of the time information.

After correcting either the reception time of the data or the time information, the time prediction part 6b calculates the difference between the reception time of the data and the time indicated by the time information (=the reception time of the data—the time indicated by the time information) (step ST5). When calculating the difference between them, the time prediction part 6b compares the difference with a minimum (i.e., the smallest one of differences previously calculated) (step ST6), and, when the difference is smaller than the minimum, sets the difference as the minimum (step ST7). In an initial state, a very large value is set as the minimum, and, in the first comparison processing, it is usually judged that the difference<the minimum. When setting the difference between the reception time of the data and the time indicated by the time information as the minimum in the above-mentioned way, the time prediction part 6b predicts the shortest time at which the storage amount of data in the storage unit 2 reaches a predetermined amount using the minimum (step ST8). After completing the process of step ST8, the data playback apparatus returns to the process immediately after the start.

Hereafter, the prediction process carried out by the time prediction part 6b will be explained concretely. Assume that the relation between the time information added to data transmitted from the transmitting side and the time is expressed by a straight line S, as shown in FIG. 4, and the slope dS/dt of the straight line S is known in the time prediction part 6b. When the time prediction part 6b acquires the time information from the receiving unit 1 and also acquires the reception time of the data from the reception time measuring part 6a, the time prediction part plots the relation between the reception time of the data and the time information, and draws a receive curve R on the graph of FIG. 4.

Next, the time prediction part 6b draws a prediction straight line F which is used to predict the time when the storage amount of data in the storage unit 2 becomes the predetermined amount on the graph of FIG. 4 in such a manner that the slope dF/dt of the prediction straight line F becomes the same as the slope dS/dt of the straight line S and the prediction straight line F passes through a point at which the difference between the reception time of the data and the time indicated by the time information becomes a minimum (i.e., a point projecting toward a leftward direction in the receive curve R, at which the transmission delay becomes a minimum). After drawing the prediction straight line F on the graph of FIG. 4, the time prediction part 6b notifies the shortest time, on the prediction straight line F, at which A seconds of data are stored in the storage unit 2 to the playback control part 6c.

When the playback control part 6c of the control unit 6 receives the notification of the shortest time at which A seconds of data are stored in the storage unit 2 from the time prediction part 6b, the playback control part acquires the time from the clock 5, and, when the time indicates the shortest time at which A seconds of data are stored in the storage unit 2 (step ST9), the playback control part outputs a command for starting a playback of data to the playback unit 4 (step ST10). When the command for starting a playback of data is outputted from the control unit 3, the playback unit 4 extracts the data stored in the storage unit 2 and then starts a playback of the data (step ST11). After that, the data playback apparatus plays back the data while receiving data.

As can be seen from the above description, the data playback apparatus according to this Embodiment 2 includes the time prediction part 6a for detecting a minimum of the difference between the time measured by the reception time measuring part 6a and the time indicated by the time information detected by the receiving unit 1, and for predicting the shortest time at which the storage amount of data in the storage unit 2 reaches a predetermined amount using the minimum of the difference, and the playback control part 6c for outputting a command for starting a playback of data when the shortest time predicted by the time prediction part 6a comes, and the playback unit 4 starts a playback of the data stored in the storage unit 2 when the command for starting a playback of data is outputted from the playback control part 6c. Therefore, the present embodiment offers the same advantages as provided by above-mentioned Embodiment 1, and also offers another advantage of being able to implement a playback of data with a minimum time delay while dealing with transmission fluctuations.

Because the data playback apparatus according to this Embodiment 2 simply searches for the smallest transmission delay within a short time period until it starts a playback of data after starting reception of data, the true minimum transmission delay can be smaller than the searched smallest transmission delay, but even in such a case, the storage amount of data in the storage unit 2 only increases by a small amount.

Embodiment 3.

In above-mentioned Embodiment 2, every time when the receiving unit 1 receives data and detects time information, the time prediction part 6b of the control unit 6 detects a minimum of the difference between the reception time of the data and the time indicated by the time information detected by the receiving unit 1, as previously explained. As an alternative, the time prediction part can discretely select time information which is a target for the detection of the minimum of the difference from among pieces of time information detected by the receiving unit 1. More specifically, when there is a large volume of data which is received by the receiving unit 1, if the time prediction part 6b of the control unit 6 refers to the time information added to each of all the data, and then checks to see whether the time information corresponds to a minimum transmission delay, the processing load on the control unit 6 becomes very large. Therefore, the time prediction part selects some data discretely from all the received data and sets time information added to each of the selected data as a target for the detection of the minimum of the difference. As a result, the accuracy of the minimum transmission delay time falls to some extent, but the processing load on the control unit 6 can be reduced greatly.

Embodiment 4.

Figure 6:
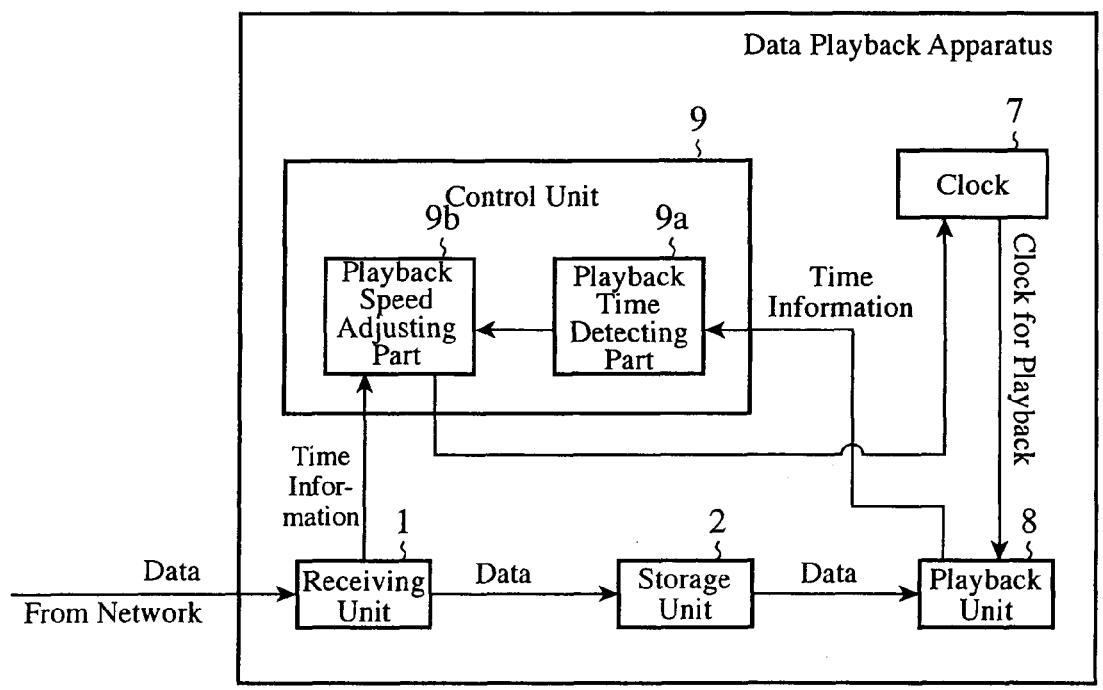
FIG. 6 is a block diagram showing a data playback apparatus in accordance with Embodiment 4 of the present invention.

FIG. 6 is a block diagram showing a data playback apparatus in accordance with Embodiment 4 of the present invention. In the figure, because the same reference numerals as those shown in FIG. 2 denote the same components or like components, the explanation of the components will be omitted hereafter. A clock 7 carries out a process of outputting a clock for playback to a playback unit 8. The playback unit 8 carries out a process of playing back data stored in a storage unit 2 in synchronization with the clock for playback outputted from the clock 7. A data playback means is comprised of the clock 7 and the playback unit 8.

A control unit 9 is comprised of a playback time detecting part 9a and a playback speed adjusting part 9b. The playback time detecting part 9a of the control unit 9 carries out a process of detecting time information added to data currently being played back by the playback unit 8. The playback time detecting part 9a constructs a playback time detecting means. The playback speed adjusting part 9b of the control unit 9 carries out a process of detecting a maximum of the difference between the time information detected by the playback time detecting part 9a and the time information detected by the receiving unit 1, and adjusting the playback speed of the playback unit 8 by changing the frequency of the clock for playback outputted from the clock 7 according to the maximum of the difference. The playback speed adjusting part 9b constructs a playback speed adjusting means.

Figure 7:
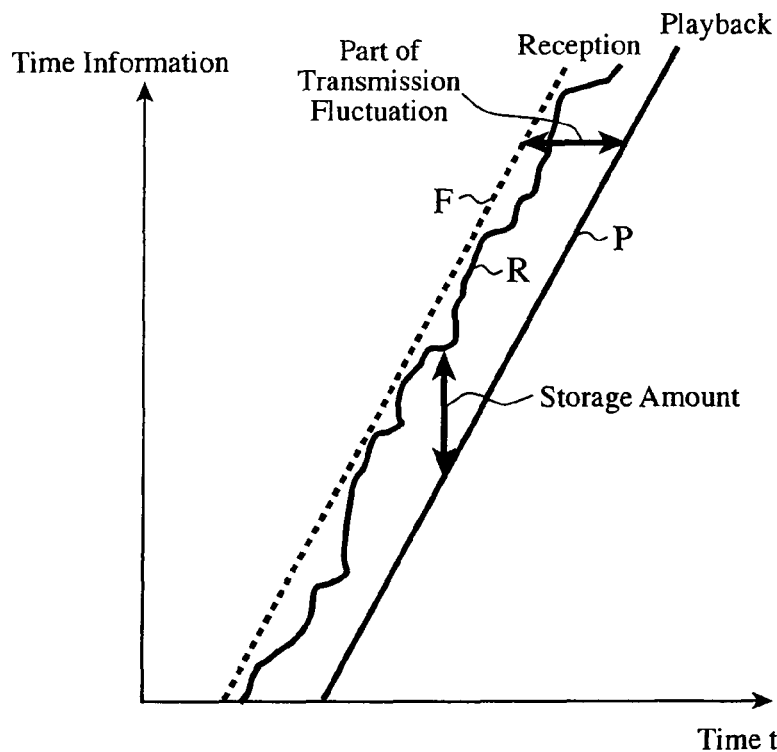
FIG. 7 is an explanatory drawing showing a relation between the reception time of data and time information added to the data.

FIG. 7 is an explanatory drawing showing the relation between the reception time of data and the time information added to the data. A transmitting side is transmitting data to which time information is added with progress of time. Because the data transmitted from the transmitting side reaches the receiving side with a transmission delay, the relation between the time information added to the data and the reception time of the data is not expressed by a straight line, but is expressed by a curve R. In contrast, because the playback unit 8 plays back data at regular intervals in synchronization with the clock for playback outputted from the clock 7, the relation between the time information added to the data and the playback time of the data is expressed by a straight line P.

In FIG. 7, the difference in a vertical direction between the receiving curve R and the playback straight line P corresponds to the amount of data stored in the storage unit 2 at that time. It is desirable that even if a large transmission fluctuation occurs, the storage amount of data in the storage unit 2 does not become zero and the storage amount of data does not become large too much. In this Embodiment 4, a method of adjusting the clock for playback outputted from the clock 7 and changing the slope of the playback straight line P is adopted as a method of controlling increase or decrease in the storage amount of data in the storage unit. For example, by steepening the slope of the playback straight line P, the storage amount of data in the storage unit can be reduced with progress of time.

However, because the storage amount of data in the storage unit is increased or decreased due to a transmission fluctuation, a guide for calculation of a proper storage amount is needed. Originally, the storage amount of data in the storage unit 2 is the amount of data needed for dealing with transmission fluctuations, and, when the transmission delay is the smallest, an amount of data corresponding to the maximum transmission fluctuation must be stored. Therefore, it is necessary to search for a point at which the transmission delay is the smallest from the receive curve R, and to control the storage amount at that time so that the storage amount becomes equal to the amount of data needed for dealing with transmission fluctuations. In this Embodiment 4, a dotted line of FIG. 7 is the reception prediction straight line F at the time of the smallest transmission delay, and the vertical distance between this reception prediction straight line F and the playback straight line P is maintained at an appropriate distance.

Figure 8:
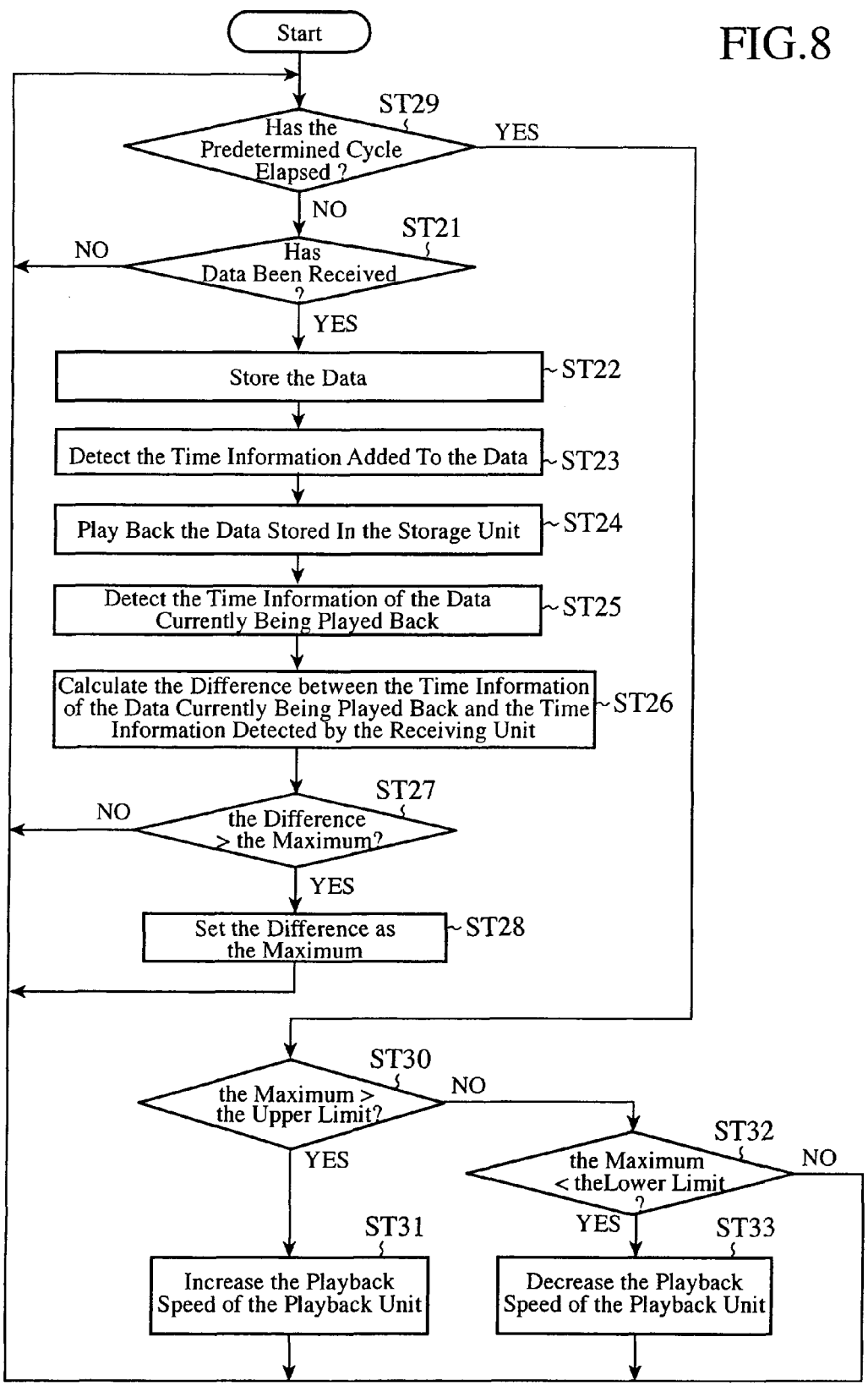
FIG. 8 is a flow chart showing a data playback method in accordance with Embodiment 4 of the present invention.

By the way, when searching for the point with the smallest transmission delay, not only the relation between the reception time and the time information but a maximum storage amount (in terms of time information) can be checked to see. That is, because the playback interval is constant, the transmission delay becomes a minimum when the storage amount becomes a maximum. In this case, it can be considered that the prediction straight line F is parallel to the playback straight line P, though no large error is included unless the slope of the playback speed is changed rapidly. Although the timing at which the playback speed is controlled corresponds to the cycle in which the smallest transmission delay is detected, when it is judged that the storage amount is extremely large, the playback speed can be controlled before the cycle in which the smallest transmission delay is detected comes, or it is judged that the data playback apparatus is not placed in a state in which the smallest transmission delay occurs because the storage amount has become small rapidly, the cycle in which the smallest transmission delay is detected can be postponed. When the storage amount of data in the storage unit 2 is made to be the same as the amount of data stored in the data playback apparatus according to above-mentioned Embodiment 2 at the time of starting a playback of data, the playback operation of the data playback apparatus of Embodiment 4 becomes continuous. FIG. 8 is a flow chart showing a data playback method in accordance with Embodiment 4 of the present invention.

Next, the operation of the data playback apparatus will be explained. When a data transmitting apparatus not shown transmits data to which time information is added to a network, the data are transmitted via the network and reaches the data playback apparatus with a transmission delay. When the data with the transmission delay reaches the data playback apparatus, the receiving unit 1 of the data playback apparatus receives the data (step ST21) and stores the data in the storage unit 2 (step ST22). The receiving unit 1 detects the time information added to the data and outputs the time information to the control unit 9 (step ST23). Before the receiving unit 1 of the data playback apparatus receives the data, the playback speed adjusting part 9b judges whether a predetermined cycle has elapsed (step ST29). In this example shown, assuming that the predetermined cycle has not elapsed, the data playback apparatus shifts to step ST21.

The playback unit 8 acquires the clock for playback outputted from the clock 7, and plays back the data stored in the storage unit 2 in synchronization with the clock for playback (step ST24). The timing at which the playback unit 8 starts a playback of the data can be, for example, the one shown in above-mentioned Embodiments 1 to 3.

When the playback unit 8 starts a playback of the data, the playback time detecting part 9a of the control unit 9 detects the time information added to the data currently being played back by the playback unit 8 (step ST25), and outputs the time information of the data currently being played back to the playback speed adjusting part 9b. When the playback time detecting part 9a detects the time information of the data currently played back, the playback speed adjusting part 9b of the control unit 9 calculates the difference between the time information of the data currently being played back and the time information detected by the receiving unit 1 (step ST26).

When the playback speed adjusting part 9b calculates the difference between them, the playback speed adjusting part compares the difference with a maximum (i.e., the largest one of the preceding differences previously calculated) (step ST27), and, when the calculated difference is larger than the maximum, sets the difference as the maximum (step ST28). In an initial state, a zero value is set as the maximum, and it is judged that the difference>the maximum in the first-time comparison processing. In this case, the difference corresponds to the vertical difference (i.e., the storage amount of data in the storage unit 2) between the receive curve R of FIG. 7 and the playback straight line P. After completing the process of step ST28, the data playback apparatus returns to the process immediately after the start.

When the playback speed adjusting part 9b sets the difference between the time information of the data currently being played back and the time information detected by the receiving unit 1 as the maximum, the playback speed adjusting part 9b judges if the predetermined cycle has elapsed in order to cause the data playback apparatus to repeatedly carry out the processes of steps ST21 to ST28 until a predetermined time interval elapses or until the data playback apparatus processes a predetermined number of received data (step ST29). When the predetermined cycle has elapsed, the playback speed adjusting part 9b compares the updated maximum with an upper limit amount Tmax and a lower limit amount Tmin of a permissible range (the upper limit amount Tmax is the upper limit of a desired storage amount of data in the storage unit 2, the lower limit amount Tmin is the lower limit of the desired storage amount of data in the storage unit 2, and the following relation: Tmin<Tmax is established), and, when the updated maximum is larger than the upper limit amount Tmax (step ST30), increases the frequency of the clock for playback outputted from the clock 7 so as to increase the playback speed of the playback unit 8 because the storage amount of data in the storage unit 2 increases from the upper limit amount Tmax (step ST31). As a result, the storage amount of data in the storage unit 2 decreases.

In contrast, when the updated maximum is smaller than the lower limit amount Tmin (step ST32), the playback speed adjusting part 9b decreases the frequency of the clock for playback outputted from the clock 7 so as to decrease the playback speed of the playback unit 8 because the storage amount of data in the storage unit 2 decreases from the lower limit amount Tmin (step ST33). As a result, the storage amount of data in the storage unit 2 increases. Because the storage amount of data in the storage unit 2 falls within the permissible range if the updated maximum is larger than the lower limit amount Tmin and is smaller than the upper limit amount Tmax (steps ST30 and ST32), the playback speed adjusting part 9b does not change the frequency of the clock for playback outputted from the clock 7 so as to maintain the playback speed of the playback unit 8.

As can be seen from the above description, the data playback apparatus according to this Embodiment 4 is so constructed as to detect a maximum of the difference between the time information of data currently being played back, which is detected by the playback time detecting part 9a, and the time information detected by the receiving unit 1, and adjust the playback speed of the playback unit 8 by changing the frequency of the clock for playback outputted from the clock 7 according to the maximum of the difference. Therefore, the present embodiment offers an advantage of being able to store only an amount of data which makes it possible for the data playback apparatus to deal with transmission fluctuations in the storage unit 2, thereby providing a desired degree of resistance to transmission fluctuations.

In this Embodiment 4 the receiving unit 1 detects the time information added to data, as previously explained. As an alternative, when receiving the data from the receiving unit 1, the storage unit 2 can detect the time information and output the time information to the control unit 9. Furthermore, when the playback unit 8 starts a playback of data, the playback time detecting part 9a detects the time information of the data currently being played back by the playback unit 8, as previously explained. As an alternative, when data for playback are transferred from the storage unit 2 to the playback unit 8, the playback time detecting part 9a can detect the time information added to the data.

Embodiment 5.

In above-mentioned Embodiment 4, every time when the receiving unit 1 receives data and detects time information, the playback speed adjusting part 9b of the control unit 9 detects a maximum of the difference between the time information of data currently being played back and the time information detected by the receiving unit 1, as previously explained. As an alternative, the playback speed adjusting part can discretely select time information which is a target for the detection of the maximum of the difference from among pieces of time information detected by the receiving unit 1. More specifically, when there is a large volume of data which is received by the receiving unit 1, if the playback speed adjusting part 9b of the control unit 9 checks the storage amount of data in the storage unit 2 with reference to the time information added to each of all the data, the processing load on the control unit 9 becomes very large. Therefore, the playback speed adjusting part selects some data discretely from all the received data and sets the time information added to the selected data as a target for the detection of the maximum of the difference. As a result, the accuracy of the maximum of the difference falls to some extent, but the processing load on the control unit 9 can be reduced greatly.

Embodiment 6.

In above-mentioned Embodiments 1 to 5, time information indicating the playback timing of data is added to the data, as previously explained. As an alternative, information indicating the transmission timing of the transmitting side can be added, as the time information, to the data which the receiving unit 1 receives. As a result, because the relation between the reception time of the data and the time information becomes a linear one in the receiving side when there is no transmission fluctuation, there is provided an advantage of being able to make it easy to carry out detection of transmission fluctuations, thereby improving the detection accuracy of transmission fluctuations. As the information indicating the transmission timing of data of the transmitting side, the time stamp of TTS at the time of transmitting "MPEG-2 TS" according to IP, or the like can be used.

The receiving unit 1 can alternatively receive data to which information indicating the system time of a multimedia stream (or a multiplexed stream) is added as the time information. As a result, because when the playback unit 4 or 8 operates in synchronization with the system time, a time interval from the time of reception of data to the time of playback of the data is known correctly, there is provided an advantage of being able to make it easy to carry out detection of transmission fluctuations, thereby improving the detection accuracy of transmission fluctuations. PCR of "MPEG-2 TS" or the like can be used as the information indicating the system time of a multimedia stream.

The receiving unit 1 can alternatively receive data to which information indicating the display timing (the display time) or decoding timing (the decoding time) of a medium is added as the time information. As a result, because when the playback unit 4 or 8 operates in synchronization with the display time or decoding time, a time interval from the time of reception of data to the time of playback of the data is known correctly, there is provided an advantage of being able to make it easy to carry out detection of transmission fluctuations, thereby improving the detection accuracy of transmission fluctuations. As the information indicating the display timing (the display time) or decoding timing (the decoding time) of a medium, PTS or DTS of "MPEG-2 TS", the time stamp of RTP, or the like can be used.

Embodiment 7.

Figure 9:
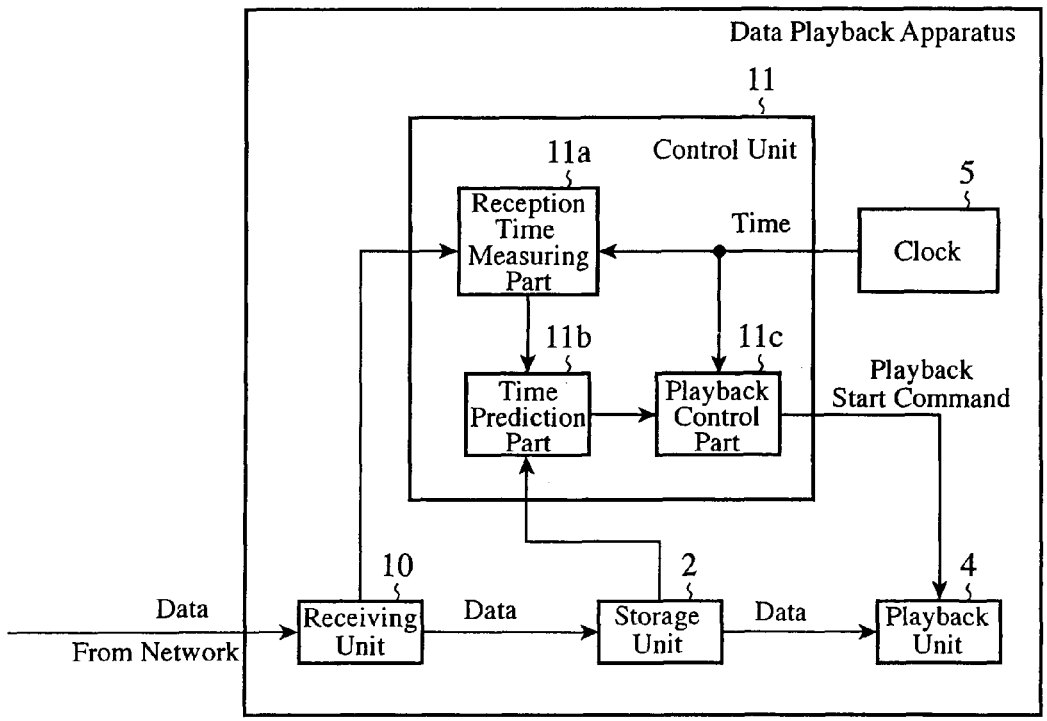
FIG. 9 is a block diagram showing a data playback apparatus in accordance with Embodiment 7 of the present invention.

FIG. 9 is a block diagram showing a data playback apparatus in accordance with Embodiment 7 of the present invention. In the figure, because the same reference numerals as those shown in FIG. 2 denote the same components or like components, the explanation of the components will be omitted hereafter. A receiving unit 10 carries out a process of receiving data transmitted at a fixed rate from a transmission line such as a network. The receiving unit 10 constructs a data receiving means. A control unit 11 is comprised of a reception time calculating part 11a, a time prediction part 11b, and a playback control part 11c.

The reception time calculation part 11a of the control unit 11 carries out a process of acquiring a time from a clock 5 so as to calculate the time when data transmitted at the fixed rate are received by the receiving unit 10. A reception time calculating means is comprised of the clock 5 and the reception time calculation part 11a. The time prediction part 11b of the control unit 11 carries out a process of predicting the shortest time at which the storage amount of data in the storage unit 2 reaches a predetermined amount from the relation between the storage amount of data in the storage unit 2 and the time calculated by the reception time calculation part 11a. The time prediction part 11b constructs a time prediction means. The playback control part 11c of control unit 11 carries out a process of outputting a command for starting a playback of data to the playback unit 4 when the shortest time predicted by the time prediction part 11b comes. The playback control part 11c constructs a playback control means.

Figure 10:
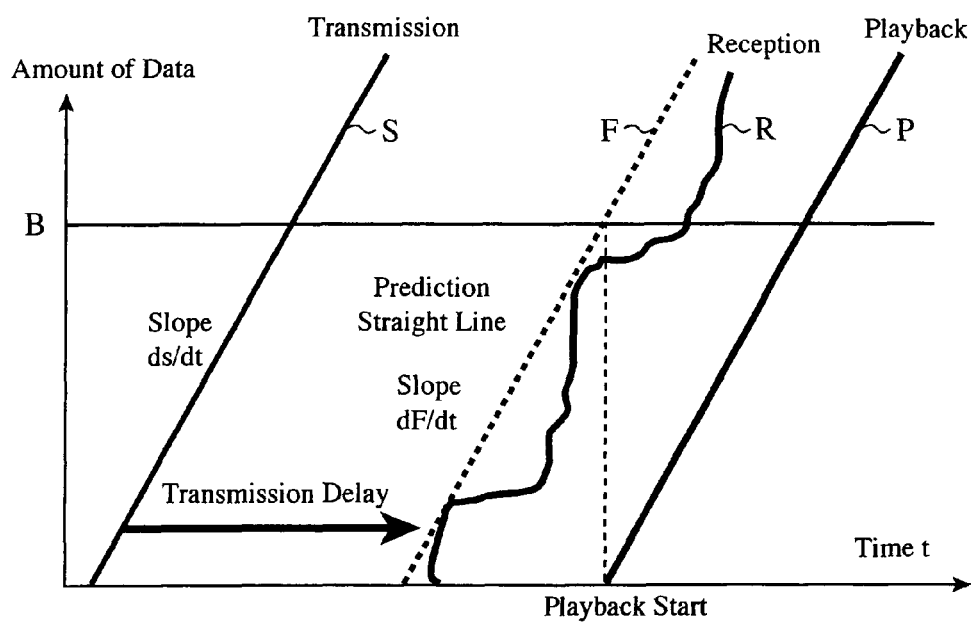
FIG. 10 is an explanatory drawing showing a relation between a time and an amount of data.

FIG. 10 is an explanatory drawing showing the relation between the time and the amount of data in the storage unit. FIG. 10 shows that a transmitting side transmits data at a fixed rate (a fixed rate with a slope dS/dt) with progress of time (see a straight line S). The figure also shows a state in which the data transmitted from the transmitting side has arrived at the receiving side with a transmission delay. FIG. 10 shows, as an example of reception of the data, a curve R1. In this example, under the influence of transmission fluctuations, the relation between the reception time of the data and the amount of data in the storage unit is not expressed by a straight line, but is expressed by the curve. The data playback apparatus has only to store a certain storage amount of data in the storage unit 2 to such an extent that the data playback apparatus can deal with the magnitude of the transmission fluctuation, and, when the transmission delay is the smallest, has only to store an amount of data which corresponds to the maximum transmission fluctuation. In this Embodiment 7, the data playback apparatus expresses an amount of data which is required when the transmission delay is the smallest as B so as to derive the playback start timing.

Next, the operation of the data playback apparatus will be explained. When a data transmitting apparatus not shown transmits data to the network at a fixed rate (see the straight line S of FIG. 10), the data are transmitted via the network and then reaches the data playback apparatus with a transmission delay. Assume that the transmission rate of the data (i.e., the slope dS/dt of the straight line S) is known in the data playback apparatus. When the data with the transmission delay reaches the data playback apparatus, the receiving unit 10 of the data playback apparatus receives the data and stores the data in the storage unit 2.

When the receiving unit 10 starts reception of the data at the fixed rate, the reception time calculation part 11a of the control unit 11 calculates the time when the data are received by the receiving unit 10 by acquiring the time from the clock 5. More specifically, because the data are transmitted at the fixed rate and the receive rate of the data in the receiving unit 10 is equal to the transmission rate of the data (the slope dS/dt of the straight line S), the reception time calculation part 11a calculates the reception time of the data in the receiving unit 10 from the time of the clock 5 which the reception time calculation part acquires in consideration of the time of starting reception of the data and the transmission rate of the data.

When the reception time calculation part 11a calculates the reception time of the data in the receiving unit 10, the time prediction part 11b of the control unit 11 predicts the shortest time at which the storage amount of data in the storage unit 2 reaches a predetermined amount from the relation between the reception time of the data and the storage amount of data in the storage unit 2. Hereafter, the prediction process carried out by the time prediction part 11b will be explained concretely. When the time prediction part 11b acquires the reception time of the data from the reception time calculation part 11a and also acquires the storage amount of data from the storage unit 2, the time prediction part plots the relation between the reception time of the data and the storage amount of data and draws a receive curve R on the graph of FIG. 10.

Next, the time prediction part 11b draws a prediction straight line F which is used to predict the time when the storage amount of data in the storage unit 2 reaches the predetermined amount of data on the graph of FIG. 10 in such a manner that the slope dF/dt of the prediction straight line F becomes the same as the slope dS/dt of the straight line S and the prediction straight line F passes through a point at which the difference between the reception time of the data and the storage amount of data (in terms of time) becomes a minimum (i.e., a point projecting toward a leftward direction in the receive curve R, at which the transmission delay becomes a minimum). After drawing the prediction straight line F on the graph of FIG. 10, the time prediction part 11b notifies the shortest time on the prediction straight line F at which the storage amount of data in the storage unit 2 reaches the B to the playback control part 11c.

When the playback control part 11c of the control unit 11 receives the notification of the shortest time at which the storage amount of data in the storage unit 2 reaches the B from the time prediction part 11b, the playback control part acquires the time from the clock 5, and, when the time indicates the shortest time at which the storage amount of data in the storage unit 2 reaches the B, outputs a command for starting a playback of data to the playback unit 4. When the command for starting a playback of data is outputted from the control unit 11, the playback unit 4 extracts the data stored in the storage unit 2 and then starts a playback of the data. After that, the data playback apparatus plays back the data while receiving data.

As can be seen from the above description, the data playback apparatus according to this Embodiment 7 includes the time prediction part 11b for predicting the shortest time at which the storage amount of data in the storage unit 2 reaches the predetermined amount from the relation between the storage amount of data in the storage unit 2 and the time calculated by the reception time calculation part 11a, and the playback control part 11c for outputting a command for starting a playback of data when the shortest time predicted by the time prediction part 11b comes, and the playback unit 4 starts a playback of the data stored in the storage unit 2 when the command for starting a playback of data is outputted from the playback control part 11c. Therefore, the present embodiment offers the same advantages as provided by above-mentioned Embodiment 1, and also offers another advantage of being able to implement a playback of data with a minimum time delay while dealing with transmission fluctuations.

Embodiment 8.

In above-mentioned Embodiments 1, 2 and 7, the timing at which a playback of data is started, which is suitable for dealing with transmission fluctuations, is determined, as previously explained. However, there is a possibility that when the playback unit 4 cannot play back received data from the head of the received data, for example, when because the received data are a midway part of a stream, the playback unit 4 cannot play back the received data until it finds out a point at which it can decode the data, the playback unit 4 skips the data to the point at which it can decode the data. In such a case, there is a possibility that even if the data playback apparatus stores only an optimal amount of data in the storage unit 2 in consideration of transmission fluctuations, the data playback apparatus performs a skip of data immediately after starting a playback of data and this results in rapid decrease in the amount of data stored in the storage unit 2, and therefore only an amount of data with which the data playback apparatus cannot deal with transmission fluctuations remains in the storage unit.

To solve this problem, in accordance with this Embodiment 8, the storage unit 2 stores data corresponding points including and following a point from which they can be played back by the playback unit 4 among the data received by the receiving unit 1, and discards the part of data preceding at those points. As a result, when the playback unit 4 starts a playback of data, because the playback unit does not perform any skip of data stored in the storage unit 2, the data stored in the storage unit 2 do not decrease rapidly, and therefore the data playback apparatus can also withstand occurrence of a shortage of the amount of data due to data fluctuations. Because the playback unit 4 discards the part of data preceding at the point from which the playback unit can play back, the data playback apparatus can store an amount of data with which it can deal with a desired amount of transmission fluctuation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data playback apparatus comprising:
a data receiving unit configured to receive data through a transmission path, the received data including time information;
a time information detecting unit configured to detect the time information from the data received by said data receiving unit;
a data storage unit configured to store the data received by said data receiving unit;
a playback control unit configured to store the time information detected from initial data received by the data receiving unit, and to output a playback start command when a difference between a value indicated by the stored time information of the initial data and a value indicated by the time information detected from data succeeding to the initial data reaches a predetermined amount; and
a data playback unit configured to start a playback of the data stored in said data storage unit when recognizing the playback start command outputted from said playback control unit.

2. The data playback apparatus according to claim 1, wherein said data receiving unit receives data including information indicating a transmission timing of a transmitting side as the time information.

3. The data playback apparatus according to claim 1, wherein said data receiving unit receives data including information indicating a system time of a multimedia stream as the time information.

4. The data playback apparatus according to claim 1, wherein said data receiving unit receives data including information indicating a display timing or a decoding timing of a piece of media as the time information.

5. The data playback apparatus according to claim 1, wherein said data storage unit stores data succeeding to a point enabling the data playback unit to implement the playback among the data received by said data receiving unit, and discards data preceding the point.

6. A data playback apparatus comprising:
a data receiving unit configured to receive data through a transmission path, the received data including time information;
a time information detecting unit configured to detect the time information from the data received by said data receiving unit;
a data storage unit configured to store the data received by said data receiving unit;
a reception time measuring unit configured to measure a reception time of the data received by said data receiving unit;
a time prediction unit configured to detect a minimum amount of a difference between the reception time measured by said reception time measuring unit and a time indicated by the time information detected by said time information detecting unit, and to predict a shortest time for which a storage amount of data in said data storage unit reaches a predetermined amount by using the detected minimum amount of the difference;
a playback control unit configure to output a playback start command when the shortest time predicted by said time prediction unit comes; and
a data playback unit configured to start a playback of the data stored in said data storage unit when recognizing the playback start command outputted from said playback control unit.

7. The data playback apparatus according to claim 6, wherein the time prediction unit discretely selects time information which is a target for the detection of the minimum amount of the difference from among time information detected by said time information detecting unit.

8. The data playback apparatus according to claim 6, wherein said data receiving unit receives data including information indicating a transmission timing of a transmitting side as the time information.

9. The data playback apparatus according to claim 6, wherein said data receiving unit receives data including information indicating a system time of a multimedia stream as the time information.

10. The data playback apparatus according to claim 6, wherein said data receiving unit receives data including information indicating a display timing or a decoding timing of a piece of media as the time information.

11. The data playback apparatus according to claim 6, wherein said data storage unit stores data succeeding to a point enabling the data playback unit to implement a playback among the data received by said data receiving unit, and discards data preceding the point.

12. A data playback apparatus comprising:
a data receiving unit configured to receive data through a transmission path, the received data including time information;
a time information detecting unit configured to detect the time information from the data received by said data receiving unit;
a data storage unit configured to store the data received by said data receiving unit;
a data playback unit configured to play back the data stored in said data storage unit;
a playback time detecting unit configured to detect time information included in current playback data being played back by said data playback unit; and
a playback speed adjusting unit configured to detect a maximum amount of a difference between a value indicated by the time information detected from current playback data by said playback time detecting means when the data receiving unit receives data through the transmission path and a value indicated by the time information detected from said data received by said time information detecting unit, and to adjust a playback speed of said data playback unit according to the detected maximum of the difference.

13. The data playback apparatus according to claim 12, wherein said playback speed adjusting unit discretely selects time information which is a target for the detection of the maximum amount of the difference from among time information detected by said time information detecting unit.

14. The data playback apparatus according to claim 12, wherein said data receiving unit receives data including information indicating a transmission timing of a transmitting side as the time information.

15. The data playback apparatus according to claim 12, wherein said data receiving unit receives data including information indicating a system time of a multimedia stream as the time information.

16. The data playback apparatus according to claim 12, wherein said data receiving unit receives data including information indicating a display timing or a decoding timing of a piece of media as the time information.

17. A data playback apparatus comprising:
a data receiving unit configured to receive data transmitted at a fixed rate from a transmission path;

a data storage unit configured to store the data received by said data receiving unit;

a reception time calculating unit configured to calculate a reception time of the data received by said data receiving unit;

a time prediction unit configured to predict a shortest time for which a storage amount of data in said data storage unit reaches a predetermined amount by using a relation between a storage amount of data in said data storage unit and the reception time calculated by said reception time calculating unit;

a playback control unit configured to output a playback start command when the shortest time predicted by said time prediction unit comes; and a data playback unit configured to start a playback of the data stored in said data storage unit when recognizing the playback start command outputted from said playback control unit.

18. The data playback apparatus according to claim 17, wherein said data storage unit stores data succeeding to a point enabling the data playback unit to implement a playback among the data received by said data receiving unit, and discards data preceding the point.

19. A data playback method implemented by hardware to playback data, comprising:

receiving data through a transmission path, the received data including time information;

detecting the time information from the received data;

storing the received data into a memory;

measuring a reception time of the received data;

detecting a minimum amount of a difference between the measured reception time and a time indicated by the time information detected from the received data, and predicting a shortest time for which a storage amount of data in the memory reaches a predetermined amount by using the detected minimum amount of the difference;

outputting a playback start command when the predicted shortest time comes; and starting a playback of the data stored in the memory when recognizing the output playback start command.

20. A data playback method implemented by hardware to playback data, comprising:

receiving data through a transmission path, the received data including time information;

detecting the time information from the received data;

storing the received data into a memory;

playing back the data stored in the memory;

detecting time information included in current playback data being played back; and detecting a maximum amount of a difference between a value indicated by the time information detected from current playback data when receiving data through the transmission path and a value indicated by the time information detected from said data received through the transmission path, and adjusting a playback speed applied to the data in the memory according to the detected maximum of the difference.

* * * * *